US010802290B2

(12) United States Patent
Lin et al.

(10) Patent No.: US 10,802,290 B2
(45) Date of Patent: Oct. 13, 2020

(54) DISPLAY DEVICE ASSEMBLY

(71) Applicant: AmTRAN TECHNOLOGY Co., Ltd., New Taipei (TW)

(72) Inventors: Huang-Pin Lin, New Taipei (TW); Pei-Song Wang, New Taipei (TW)

(73) Assignee: AMTRAN TECHNOLOGY CO., LTD., New Taipei (TW)

(*) Notice: Subject to any disclaimer, the term of this patent is extended or adjusted under 35 U.S.C. 154(b) by 95 days.

(21) Appl. No.: 16/243,085

(22) Filed: Jan. 9, 2019

(65) Prior Publication Data
US 2019/0212567 A1 Jul. 11, 2019

Related U.S. Application Data

(60) Provisional application No. 62/615,019, filed on Jan. 9, 2018.

(51) Int. Cl.
G02B 27/14 (2006.01)
G02B 27/01 (2006.01)
H04R 1/02 (2006.01)

(52) U.S. Cl.
CPC ..... *G02B 27/0176* (2013.01); *G02B 27/0172* (2013.01); *H04R 1/028* (2013.01); *H04R 2499/15* (2013.01)

(58) Field of Classification Search
CPC ............ G02B 27/0172; G02B 27/0176; G02B 27/0179; G02B 2027/0178
See application file for complete search history.

(56) References Cited

U.S. PATENT DOCUMENTS

| 6,292,305 | B1 * | 9/2001 | Sakuma | G02B 27/0101 |
| | | | | 359/630 |
| 6,637,896 | B2 * | 10/2003 | Li | G03B 21/10 |
| | | | | 353/119 |
| 2014/0104692 | A1 | 4/2014 | Bickerstaff et al. | |
| 2017/0255018 | A1 * | 9/2017 | Goldstein | G02B 27/0172 |
| 2018/0284454 | A1 * | 10/2018 | Reed | G02B 27/0172 |

FOREIGN PATENT DOCUMENTS

| JP | 6-331928 A | 12/1994 |
| JP | 2014107725 | 6/2014 |
| JP | 2015-46712 A | 3/2015 |
| JP | 2016-145960 A | 8/2016 |
| KR | 10-2014-0078237 A | 6/2014 |
| WO | 2016148663 | 9/2016 |

* cited by examiner

*Primary Examiner* — Alicia M Harrington
(74) *Attorney, Agent, or Firm* — CKC & Partners Co., LLC

(57) ABSTRACT

A display device assembly adapted to assemble a display unit to a display device includes a frame body, an optical element, and a supporting element connected to the frame body. The frame body fixes the display unit to be inclined to a viewing direction by a first angle. The display unit provides an image beam. The optical element is disposed on the frame body and inclined to the viewing direction by a second angle, and the optical element and the display unit face each other. The optical element has a multi-layer coating and located on a transmission path of the image beam. The image beam is transmitted to the optical element for reflection and transmitted to a user, so that the user observing the optical element in the viewing direction obtains a combination of a virtual image and an environmental image presented by the real world.

19 Claims, 10 Drawing Sheets

DISPLAY DEVICE ASSEMBLY

CROSS-REFERENCE TO RELATED APPLICATION

This application claims the priority benefit of U.S. provisional application Ser. No. 62/615,019, filed on Jan. 9, 2018. The entirety of the above-mentioned patent application is hereby incorporated by reference herein and made a part of this specification.

TECHNICAL FIELD

The disclosure relates to an electronic device assembly, and more particularly, to a display device assembly.

DESCRIPTION OF RELATED ART

In recent years, head-mounted displays (HMDs) with mixed real-world features have become a hot topic, and human perception has become a key factor in communication or interaction with virtual events and objects. Accordingly, virtual reality (VR) HMDs have been developed. After users watch the virtual screen for a period of time, the presented stereoscopic images may cause motion sickness or bring dizziness and discomfort to the users, and the users cannot well perceive environmental images in the real world. In response thereto, see-through HMDs have been developed to comply with augmented reality (AR) or mixed reality (MR) technologies.

According to the conventional technologies, the HMDs are often equipped with beam splitters or lenses with a positive refractive power, so as to reduce the distance between the displayed images and human eyes. This however may lead to excessive power consumption of the light emitting source and the resultant overheating issue. Besides, the increase in the number of elements also increases the weight of the HMDs. Some of the existing HMDs include two square lenses aligned side-by-side, and the side-by-side lenses reflect side-by-side images displayed on single display panel to left eye and right eye of the user respectively. The design of side-by-side lenses tries to provide different views to left and right eyes of the user, however, the reflected images are not blocked from both eyes of the user, thus the user may perceive image crosstalk defect. In addition, the single display panel displays side-by-side images with half resolutions of the display panel, thus the reflected images cannot be perfectly matched with actual images, deteriorating user's perception and visual experience.

SUMMARY

The disclosure provides a display device assembly which can be assembled to form a display device with low costs and favorable optical effects.

In an embodiment of the disclosure, a display device assembly adapted to assemble a display unit to a display device is provided. The display device is adapted to be watched by a user in a viewing direction. The display device assembly includes a frame body, an optical element, and a supporting element. The frame body is adapted to fix the display unit to be inclined to a viewing direction by a first angle. The display unit is adapted to provide an image beam. The optical element is disposed on the frame body and inclined to the viewing direction by a second angle, and the optical element and the display unit face each other. The optical element has a multi-layer coating and located on a transmission path of the image beam. The supporting element is connected to the frame body, wherein the image beam is transmitted to the optical element for generating reflection and transmitted to a user, so that the user observing the optical element in the viewing direction obtains a combination of a virtual image and an environmental image presented by a real world.

According to an embodiment of the disclosure, the supporting element is a headband adapted to be worn by the user on his or her head, so that the display device acts as a head-mounted display (HMD).

According to an embodiment of the disclosure, the frame body includes an upper casing assembly, a lower casing assembly, an upper cover, and a leaning member, wherein the upper casing assembly is configured to connect and fix the optical element. The lower casing assembly is configured to store and fix the display unit. The upper casing assembly is connected between the lower casing assembly and the upper cover, and the leaning member is disposed on the upper casing assembly, the lower casing assembly, or a combination thereof and adapted to lean against the user.

According to an embodiment of the disclosure, the lower casing assembly includes a main body and a supporting bracket, and the supporting bracket is disposed on the main body and connected and fixed to the optical element.

According to an embodiment of the disclosure, the lower casing assembly includes a main body, an elastic element, and a clamping assembly, wherein the elastic element is disposed in a groove of the main body. The clamping assembly is connected to the elastic element and clamps the display unit.

According to an embodiment of the disclosure, the elastic element is a spring with a collar structure at two ends, one of the two ends is fixed to the main body by a fixing element, and the other end is connected to the clamping assembly.

According to an embodiment of the disclosure, the clamping assembly includes a first clamping portion, a second clamping portion, and two protection cushions, wherein each of the first clamping portion and the second clamping portion has a hook structure adapted to clamp the display unit. The two protection cushions are respectively disposed on inner sides of the hook structures of the first clamping portion and the second clamping portion.

According to an embodiment of the disclosure, the display device assembly further includes a multimedia element electrically connected to the display unit, wherein the multimedia element is an earphone or a speaker.

According to an embodiment of the disclosure, the display device assembly further includes a sensing element electrically connected to the display unit and adapted to obtain a scenario from an environment or the user, so as to adjust light emitting effects of the display unit.

According to an embodiment of the disclosure, the display device assembly further includes a modulation device electrically connected to the optical element and adapted to modulate reflectivity of the optical element, wherein the optical element is a liquid crystal display layer or another electrical control material.

According to an embodiment of the disclosure, an included angle between the optical element and the display unit is in a range from 30 degrees to 80 degrees.

According to an embodiment of the disclosure, a distance from the optical element to the display unit is in a range from 50 mm to 150 mm.

According to an embodiment of the disclosure, when a height of an image displayed by the display unit is 80 mm, an enlarged virtual image with a height from 120 mm to 800 mm is displayed behind the optical element.

According to an embodiment of the disclosure, an included angle between a tangent of a center point of the optical element and a plane parallel to the optical element is in a range from 15 degrees to 60 degrees.

According to an embodiment of the disclosure, the supporting element is a helmet adapted to be worn by the user on his or her head.

According to an embodiment of the disclosure, the supporting element is a stand and has a sound channel allowing a sound made by the display unit to be transmitted to the optical element through the sound channel and transmitted toward a direction close to the display unit after the sound is reflected by the optical element.

According to an embodiment of the disclosure, the frame body includes a bearing, and the optical element is adapted to rotate relative to the frame body through the bearing, so as to be combined with or separated from the frame body.

According to an embodiment of the disclosure, the supporting element is a connection structure adapted to be connected to an accessory device. The accessory device is adapted to provide a control signal to the display unit.

According to an embodiment of the disclosure, the supporting element is a storage member adapted to store an accessory device. The accessory device is adapted to provide a control signal to the display unit.

According to an embodiment of the disclosure, the display device assembly further includes a connection member pivotally connected between the supporting element and a sliding rail of the frame body. The supporting element is adapted to slide on the sliding rail through the connection member, and the supporting element is an operating device electrically connected to the display unit and adapted to provide a control signal to the display unit.

In view of the above, the display device assembly provided in one or more embodiments of the disclosure can be assembled to the display unit to form a display device, and reflection of the optical element enables the user to obtain the virtual image on the optical element. The virtual image can be combined with the environmental image presented in the real world to form an augmented reality (AR) image or a mixed reality (MR) image. Hence, favorable optical effects can be achieved with low costs.

To make the above features and advantages provided in one or more of the embodiments of the disclosure more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles described herein.

DESCRIPTION OF THE EMBODIMENTS

Figure 1:
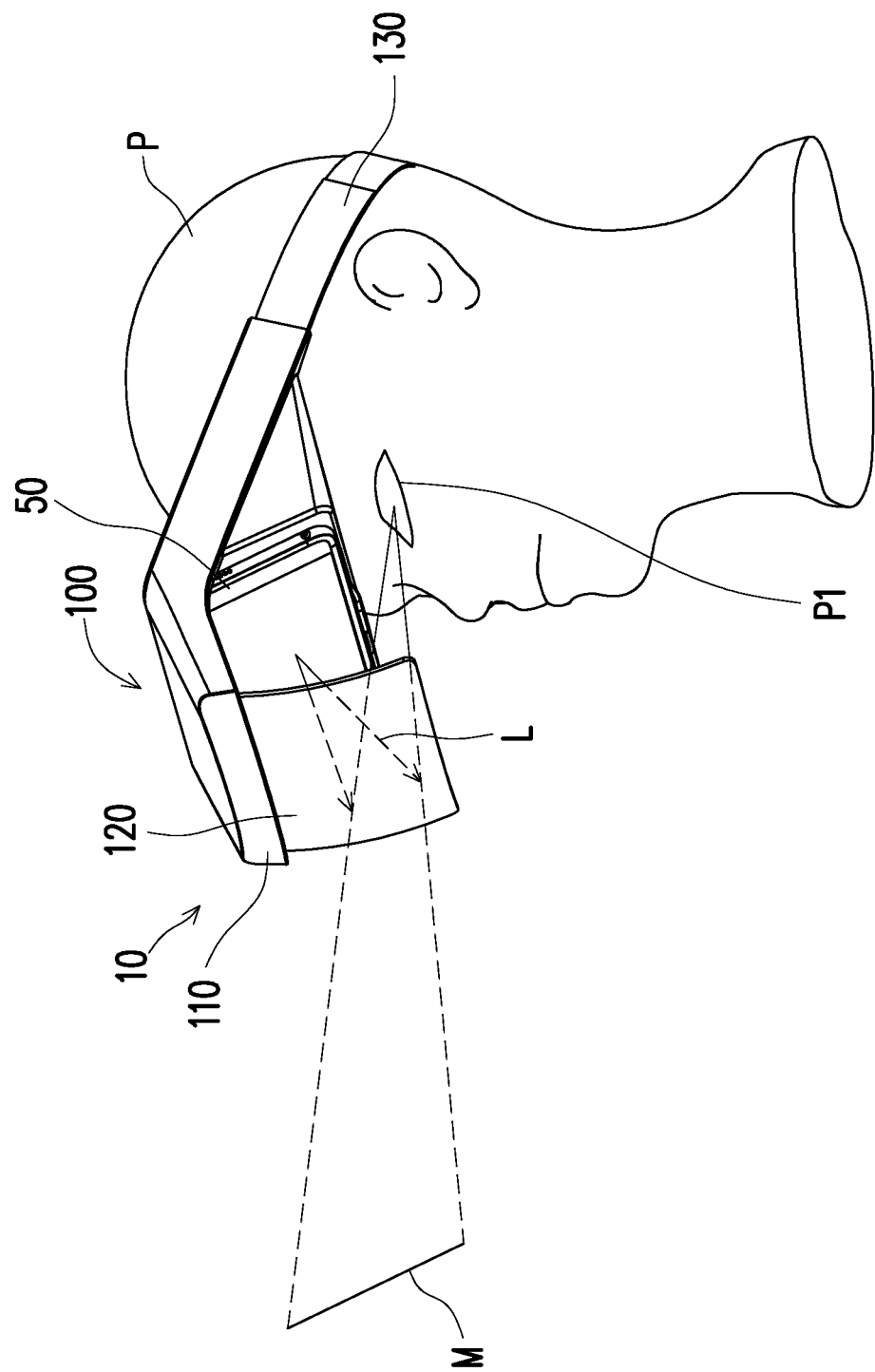
FIG. 1 is a schematic view of a display device assembly according to an embodiment of the disclosure.

FIG. 1 is a schematic view of a display device assembly according to an embodiment of the disclosure. Please refer to FIG. 1. In the present embodiment, a display device assembly 100 adapted to assemble a display unit 50 to a headset 10 is provided. The display device assembly 100 includes a frame body 110, an optical element 120, and a supporting element 130. The display unit 50 is disposed at the frame body 110, and the display unit 50 is, for instance, a mobile phone, a tablet PC, a normal display, or any other portable display device capable of providing image beams L, which should not be construed as a limitation in the disclosure. The optical element 120 is disposed on the frame body 110 and located on a transmission path of the image beams L. The optical element 120 is, for instance, a concave lens having a multi-layer coating and may be made of glass or plastic. The supporting element 130 is connected to the frame body 110. In the present embodiment, the supporting element 130 is, for instance, a headband configured to be worn by a user P on his or her head, so as to act as a head-mounted display (HMD) like the headset 10 shown in FIG. 1, which should however not be construed as a limitation in the disclosure. Hence, favorable optical effects can be achieved with low costs.

The image beams L provided by the display unit 50 is transmitted to the optical element 120 and reflected to eyes P1 of the user P by the multi-layer coating of the optical element 120, so that the user wearing the headset 10 is able to watch the optical element 120 in a viewing direction and obtain a virtual image M while watching the optical element 120. The virtual image M can then be combined with an environmental view of the real world. The combination of the frame body 110 and the optical element 120 in the display device assembly 100 with the display unit 50 can be considered as a display module, and the display module can be assembled to other types of supporting elements 130 in different embodiments of the present invention, so as to form the headset 10 of different applications.

In some embodiments of the present invention, the display device assembly 100 may further include a multimedia element electrically connected to the display unit 50. The multimedia element is, for instance, an electronic element, such as an earphone or a speaker, so as to improve interactions with the user. The display device assembly 100 may further include at least one sensing element electrically connected to the display unit 50 and adapted to detect different signals from the user P or the environment of the user P. Different scenarios can be obtained by processing the detected signals, so as to adjust image beams displayed from the display unit 50 and further allow the display device assembly 100 to provide different types of control functions or interactions to the user P. Particularly, the control functions of the display device assembly 100 can include voice control of the user P, gesture control of the user P, face recognition of the user P, movement of specific body parts of the user P, brain wave electrogram identification of the user P, changes of the physiological state (such as fatigue or emotional changes, etc.) of the user P, changes to ambient brightness, and so on, according to the types of sensing elements. Thereby, the display device assembly 100 is capable of providing visual applications in different conditions.

Figure 2:
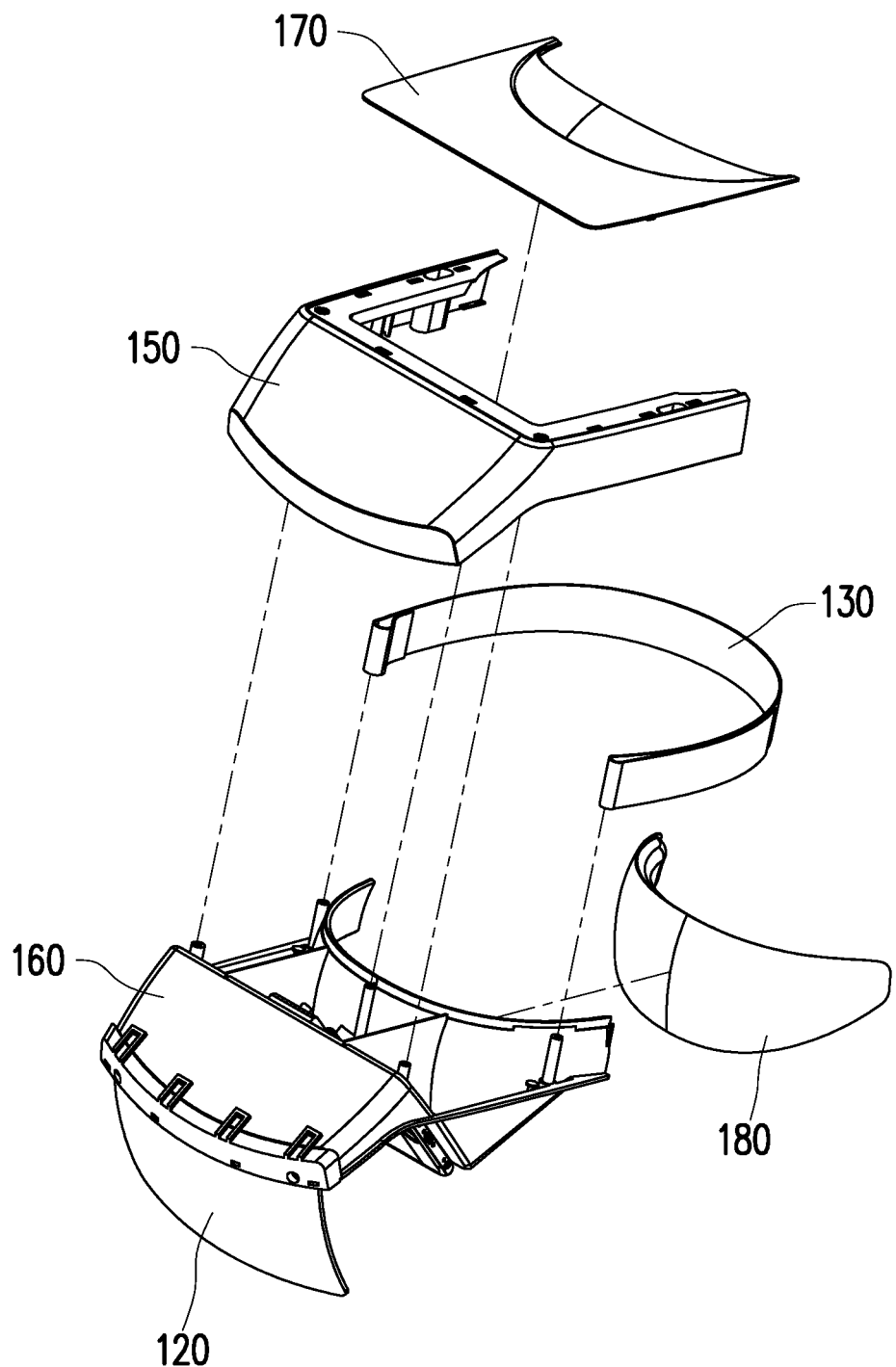
FIG. 2 is a three-dimensional exploded view illustrating a portion of the display device assembly depicted in FIG. 1.
Figure 3:
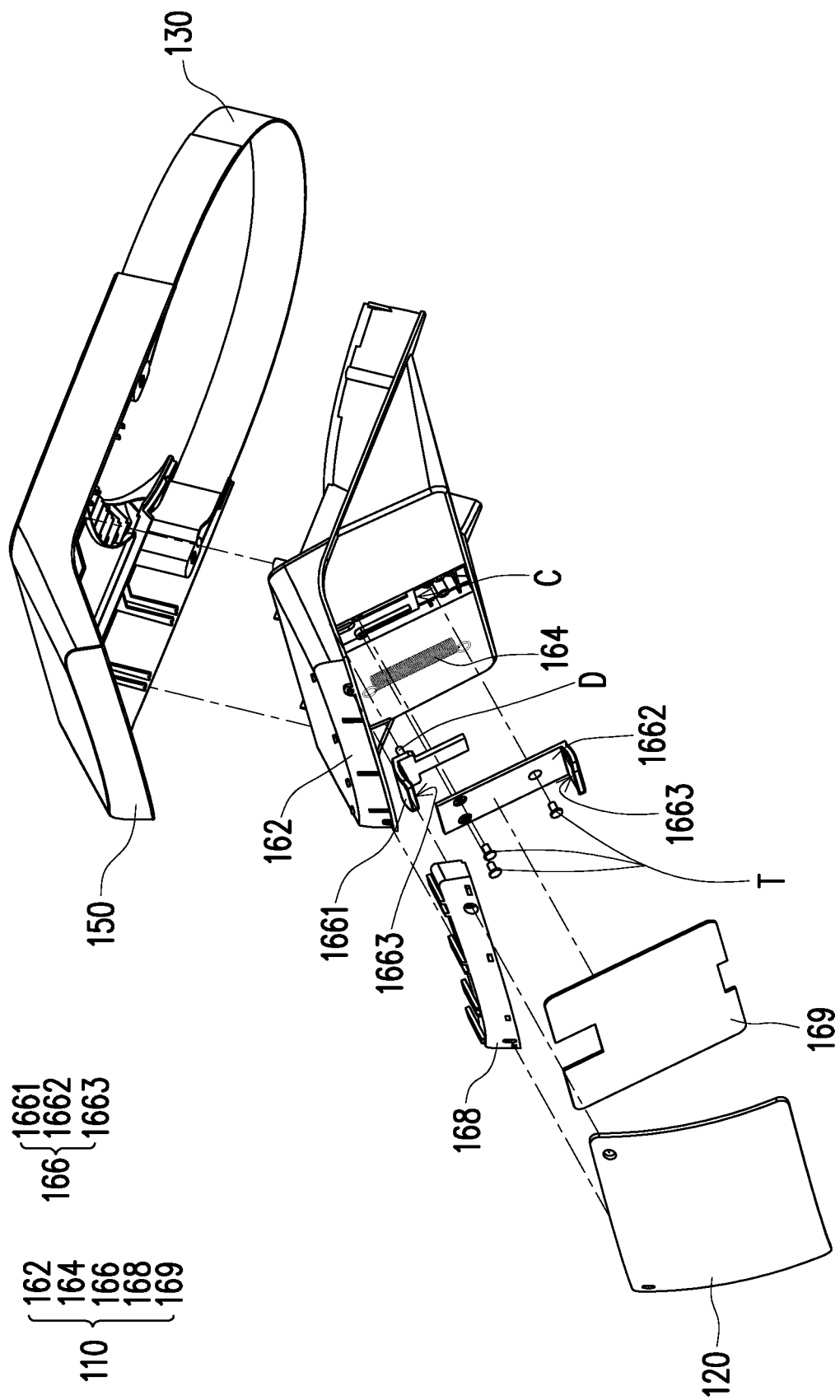
FIG. 3 is a three-dimensional exploded view illustrating a portion of the display device assembly depicted in FIG. 1.

FIG. 2 is a three-dimensional exploded view illustrating a portion of the display device assembly depicted in FIG. 1. FIG. 3 is a three-dimensional exploded view illustrating a portion of the display device assembly depicted in FIG. 1. Please refer to FIG. 1 to FIG. 3. Specifically, in the present embodiment, the frame body 110 includes an upper casing assembly 150, a lower casing assembly 160, an upper cover 170, and a leaning member 180. The lower casing assembly 160 includes a main body 162, an elastic element 164, and a clamping assembly 166. The elastic element 164 is disposed in a groove C of the main body 162. In the present embodiment, the elastic element 164 is, for instance, a spring with a collar at two ends, as shown in FIG. 3. The clamping assembly 166 includes a first clamping portion 1661, a second clamping portion 1662, and two protection cushions 1663, wherein each of the first clamping portion 1661 and the second clamping portion 1662 has a hook structure adapted to clamp the display unit 50. The lower casing assembly 160 includes a supporting bracket 168. The supporting bracket 168 is configured to connect and fix the optical element 120, and the supporting bracket 168 is disposed on the main body. The lower casing assembly 160 includes a cover plate 169 configured to cover the elastic element 164 and the clamping assembly 166. A material of one side of the cover plate 169 facing the display unit 50 can be a soft material, so as to prevent abrasion of the display unit 50, which should not be construed as a limitation in the disclosure.

More particularly, the first clamping portion 1661 has a positioning column D passing through the collar at the upper end of the elastic element 164 to fix one end of the elastic element 164. Plural fixing elements T pass through the clamping assembly 166 to fix the clamping assembly 166 onto the main body 162, wherein one fixing element T at the lower end passes through the collar at the lower end of the elastic element 164 to fix the other end of the elastic element 164. Hence, when the first clamping portion 1661 and the second clamping portion 1662 move away from each other, the elastic element 164 is stretched and has a larger elastic force as compared to the elastic force of the elastic element 164 in a default state, so as to clamp the display unit 50. Meanwhile, the elastic force provided by the elastic element 164 can be applied to slightly adjust the angle at which the display unit 50 is placed. As such, the frame body 110 is adapted to clamp the display unit 50 of different sizes. The fixing element T is, for instance, a screw, which should however not be construed as a limitation in the disclosure. The two protection cushions 1663 are respectively disposed on inner sides of the hook structures of the first clamping portion 1661 and the second clamping portion 1662 and located between the display unit 50 and the clamping portion, so as to prevent the display unit 50 from contacting and damaging the first clamping portion 1661 or the second clamping portion 1662.

In the present embodiment, the supporting element 130 can be connected between the upper casing assembly 150 and the lower casing assembly 160. The headband acting as the supporting element 130 may be made of an elastic material, so as to be worn by users P of different head shapes. The upper cover 170 is disposed on the upper casing assembly 150, and the upper casing assembly 150 is located between the upper cover 170 and the lower casing assembly 160. In the present embodiment, a leaning member 180 can be further disposed on the upper casing assembly 150, the lower casing assembly 160, or the combination of the upper casing assembly 150 and the lower casing assembly 160. The leaning member 180 is, for instance, a forehead cushion bringing wearing comfort to the user P, which should however not be construed as a limitation in the disclosure. As such, the display device assembly 100 provided in the present embodiment can perform the function of connecting the supporting element 130 and clamping the display unit 50 through the frame body 110, so as to further reduce the weight and lower the costs as compared to those provided in the related art. Moreover, the user P can wear the display device assembly 100 for a long period of time.

Please continue to refer to FIG. 1. In the present embodiment, the optical element 120 is disposed at the frame body 110, and reflectivity of the optical element 120 is in a range from 20% to 70%. The optical element 120 reflects the image beams L provided by the display unit 50, so that the user P is able to obtain an enlarged virtual image on the other side of the optical element 120 opposite to the one side of the optical element 120 facing the user P. According to the present embodiment, using a concave lens acting as the optical element 120 allows the obtained enlarged virtual image to be of higher clarity. In some embodiments, the display device assembly 100 may further include a modulation device electrically connected to the optical element 120 and adapted to modulate reflectivity of the optical element 120. The optical element 120 is, for instance, a liquid crystal display layer or any other electrical controllable material. Hence, in the previous embodiment, the user P can further modulate the reflectivity of the optical element 120 through the modulation device, so as to improve the clarity of the obtained enlarged virtual image, which should however not be construed as a limitation in the disclosure. When a diameter of the concave lens acting as the optical element 120 is in a range from 100 mm to 500 mm, the resultant reflectivity of the optical element 120 is adequate. In particular, the concave lens is one portion of a sphere with a specific diameter, and therefore part of the sight of the user P may be blocked if the concave lens is spaced from the eyes P1 of the user by a certain distance. In consideration of the weight of the optical element 120 and the distance between the eyes P1 of the user P and the optical element 120, the width and the height of the optical element 120 can fall within a range from 60 mm to 200 mm.

In another aspect, an included angle between the display unit 50 and the optical element 120 may be in a range from 15 degrees to 80 degrees, and the display surface faces the optical element 120. Neither the display unit 50 nor the optical element 120 is perpendicular to the viewing direction of the user P (i.e., the positive viewing direction). In an embodiment of the disclosure, the included angle between the display unit 50 and the optical element 120 may fall within a range from 30 degrees to 80 degrees, the distance from the display unit 50 and the optical element 120 may fall within a range from 50 mm to 150 mm, and the display unit 50 is located within a focal length of the optical element 120. According to some embodiments, when a height of an image displayed by the display unit 50 is 80 mm, through adjusting the distance from the display unit 50 to the optical element 120, an enlarged virtual image with a height from 120 mm to 800 mm is displayed behind the optical element 120, which should however not be construed as a limitation in the disclosure. According to an embodiment of the disclosure, an included angle between a tangent of a center point of the concave lens acting as the optical element 120 and a plane parallel to the optical element 120 is in a range from 15 degrees to 60 degrees. The detailed method of adjusting the display unit 50 can be derived from the explanation of the frame body 110 provided above and thus will not be further described. As such, the distance and the angle relation between the display unit 50 and the optical element 120 in the display device assembly 100 provided in the present embodiment can be adjusted; as compared to the related art, the embodiment allows the display effects of the virtual image M to be improved.

Figure 4:
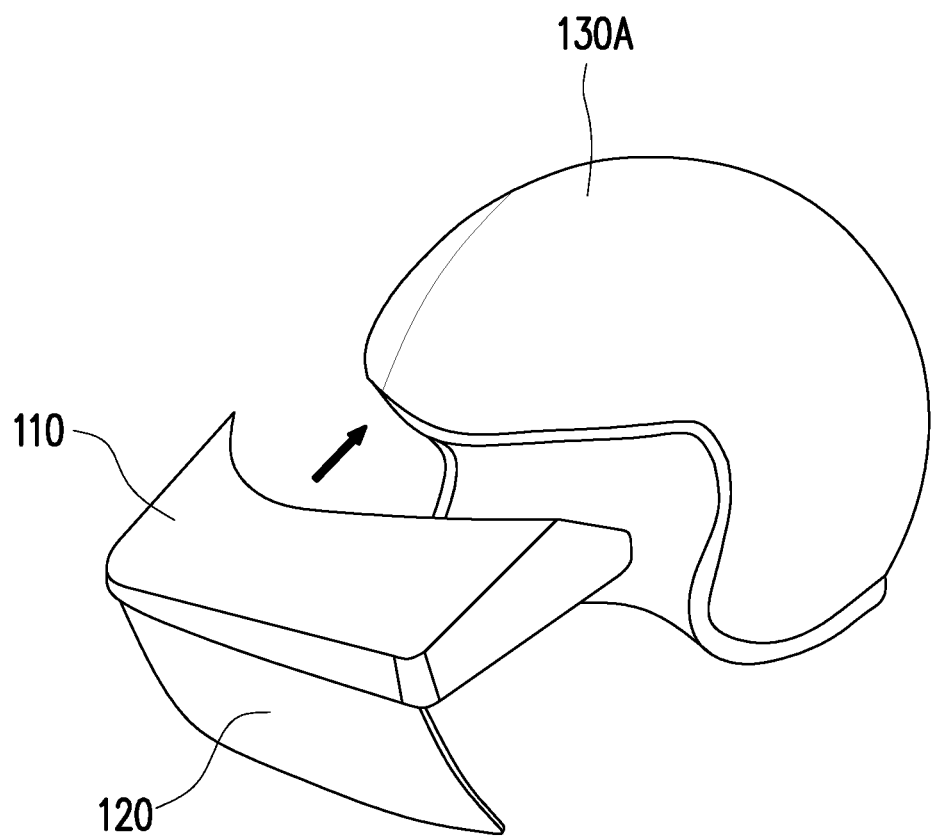
FIG. 4 is a schematic view of a display device assembly according to another embodiment of the disclosure.

FIG. 4 is a schematic view of a display device assembly according to another embodiment of the disclosure. Please refer to FIG. 4. The display device assembly 100A provided in the present embodiment is similar to the display device assembly 100 depicted in FIG. 1. The difference therebetween lies in that the supporting element 130A of the display device assembly 100A provided in the present embodiment is a helmet covering parts of the head. Specifically, the frame body 110 is disposed on the front edge of the supporting element 130A (e.g., the helmet), so that the user P is able to obtain the virtual image in the positive viewing angle on the optical element 120. The user P can further use the supporting element 130A while driving, which should however not be construed as a limitation in the disclosure. In other embodiments, the display module composed of the frame body 110, the optical element 120, and the display unit 50 can be connected to a normal hat or other types of head-mounted device to satisfy different conditions or requirements, which should however not be construed as a limitation in the disclosure. In view of the above, according to different embodiments, the display device assembly 100A can be applied in a flexible manner to different types of wearable accessories.

Figure 5:
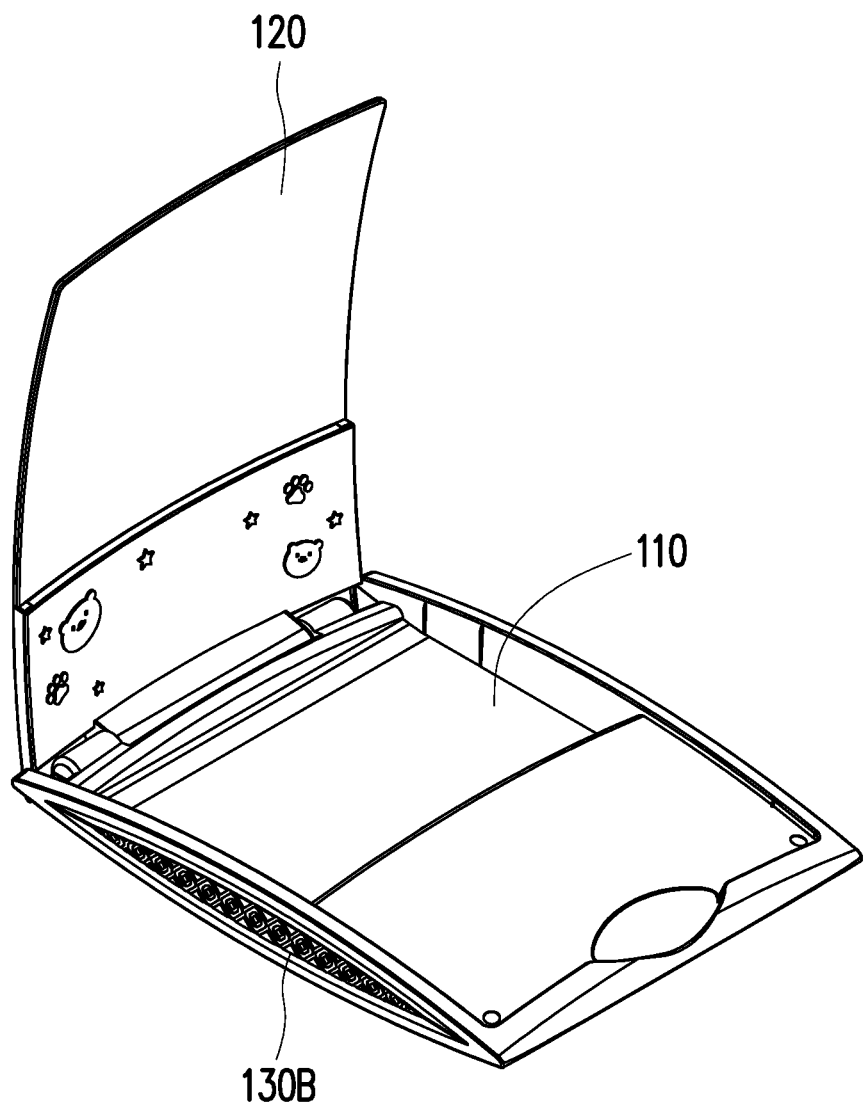
FIG. 5 is a schematic view of a display device assembly according to another embodiment of the disclosure.

FIG. 5 is a schematic view of a display device assembly according to another embodiment of the disclosure. Please refer to FIG. 5. The display device assembly 100B provided in the present embodiment is similar to the display device assembly 100 depicted in FIG. 1. The difference therebetween lies in that the supporting element 130B of the display device assembly 100B provided in the present embodiment is a stand, the optical element 120 is axially connected to the supporting element 130B, and the frame body 110 is adapted to store and fix a tablet PC or a mobile phone. In the storage stage, the tablet PC or the mobile phone can be placed onto the supporting element 130B in a flat manner, and the optical element 120 is rotated to a closed location to cover the supporting element 130B. While the supporting element 130B is in use, the optical element 120 can be rotated to the location shown in FIG. 5 and can stand at one end of the supporting element 130B, and the tablet PC or the mobile phone can be fixed to a location facing the optical element 120 by a fixing member or a clamping member on the supporting element 130B, so that images can be generated on the screen by the optical element 120. Specifically, in the present embodiment, the stand is equipped with a sound channel (not shown) allowing a sound made by the tablet PC to be transmitted to the optical element 120 through the stand and reflected by the concave surface of the optical element 120 and transmitted toward a direction of the user P, so that the user P may obtain an illusion that the sound can be received from the optical element 120. As such, the user P not only can obtain the enlarged virtual image corresponding to the tablet PC through the optical element 120 but also can obtain a corresponding sound from the direction of the displayed image, so as to gain good visual and audio experience.

Figure 6A:
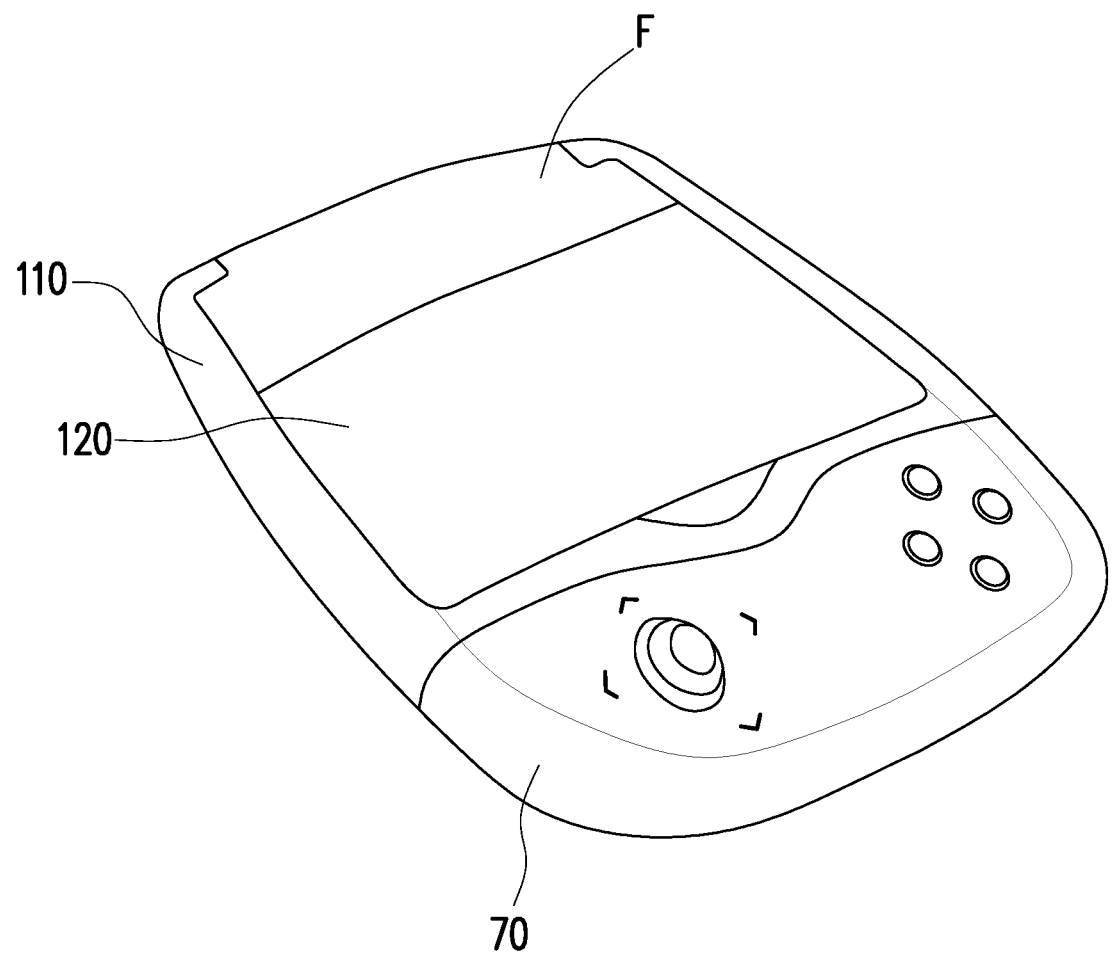
FIG. 6A and FIG. 6B are schematic views illustrating a display device assembly is being stored and unfolded according to another embodiment of the disclosure.
Figure 6B:
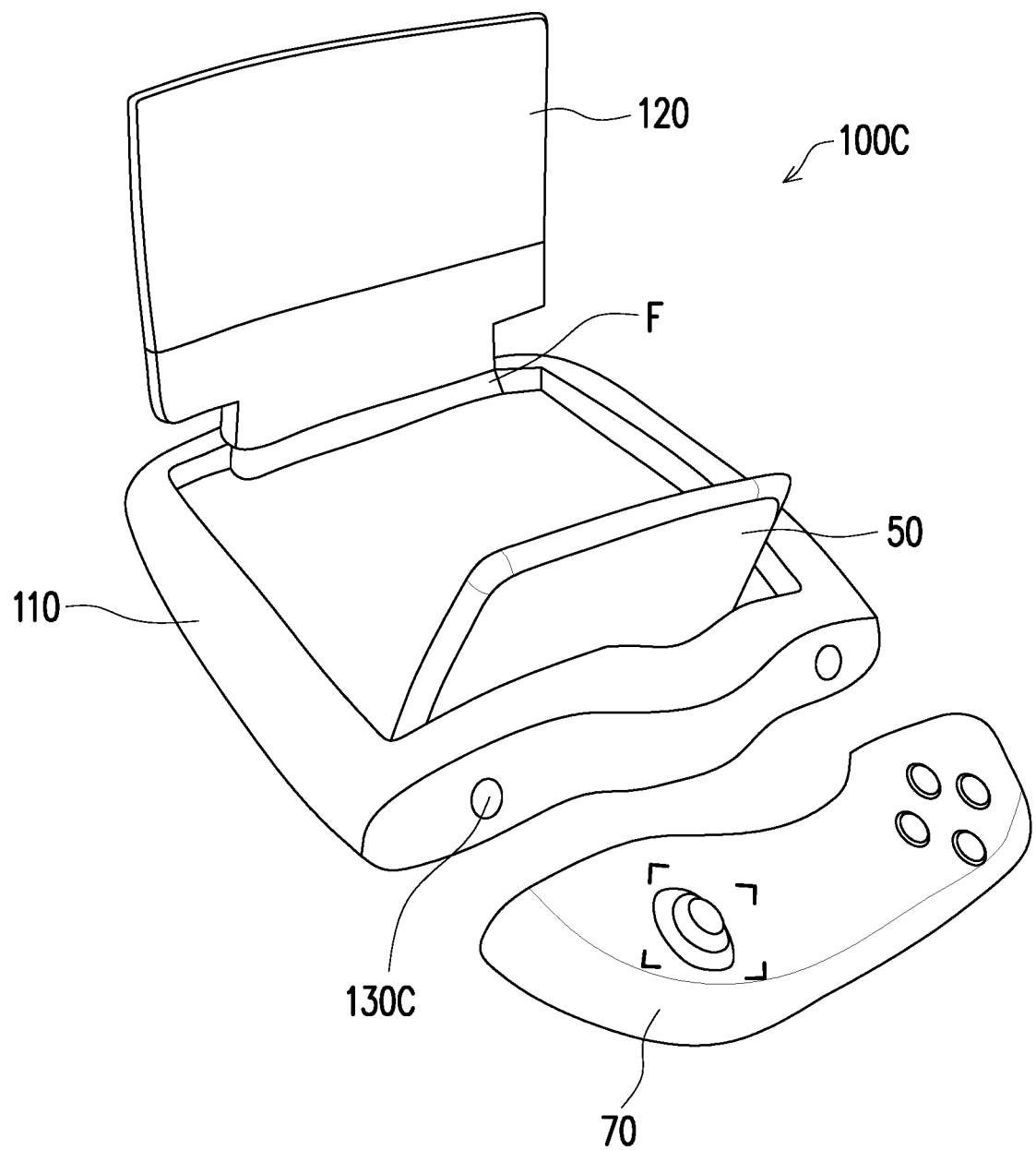

FIG. 6A and FIG. 6B are schematic views illustrating a display device assembly is being stored and unfolded according to another embodiment of the disclosure. Please refer to FIG. 6A and FIG. 6B. The display device assembly 100C provided in the present embodiment is similar to the display device assembly 100 depicted in FIG. 1. The difference therebetween lies in that the optical element 120 of the display device assembly 100C provided in the present embodiment can be pivotally connected to the main body of the frame body 110 through a bearing F of the frame body 110, and the supporting element 130C can be a connection structure of an accessory device 70 adapted to provide a control signal to the display unit 50, so as to operate the display unit 50. In the present embodiment, the accessory device 70 is, for example, a steerable wired or wireless motion joystick.

Particularly, in the storage state, the optical element 120 provided in the present embodiment can be rotated through the bearing F and combined to the frame body 110, and the accessory device 70 can fit the connection structure of the supporting element 130C and can be stored together, as shown in FIG. 6A. Hence, the volume of the display device assembly 100C in the storage state is smaller. On the other hand, in the use state, the optical element 120 provided in the present embodiment can be rotated through the bearing F and unfolded from the frame body 110, so as to display the image sent by the optical element 120. The accessory device 70 can be separated from the supporting element 130C that the user P can hold and use the accessory device 70. According to the present embodiment, the frame body 110 and the optical element 120 are made of plastic, and thus the weight can be further reduced.

Figure 7A:
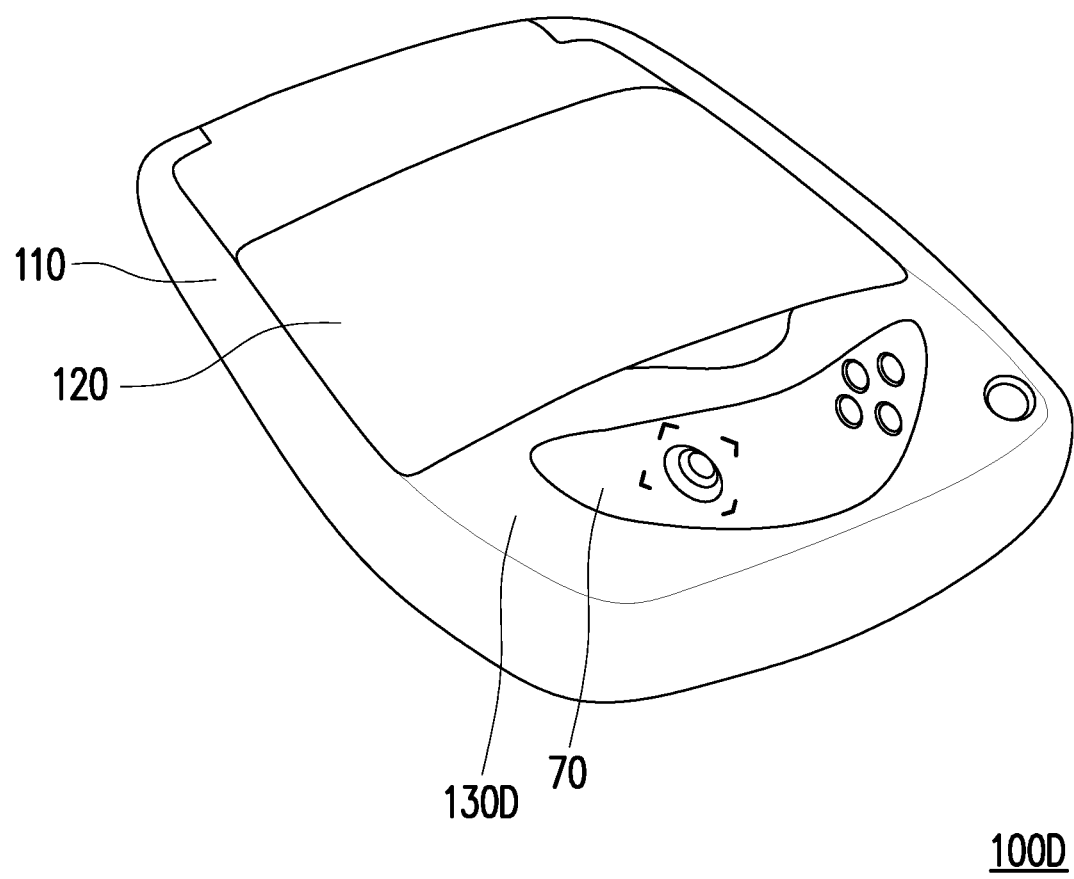
FIG. 7A and FIG. 7B are schematic views illustrating a display device assembly is being stored and unfolded according to another embodiment of the disclosure.
Figure 7B:
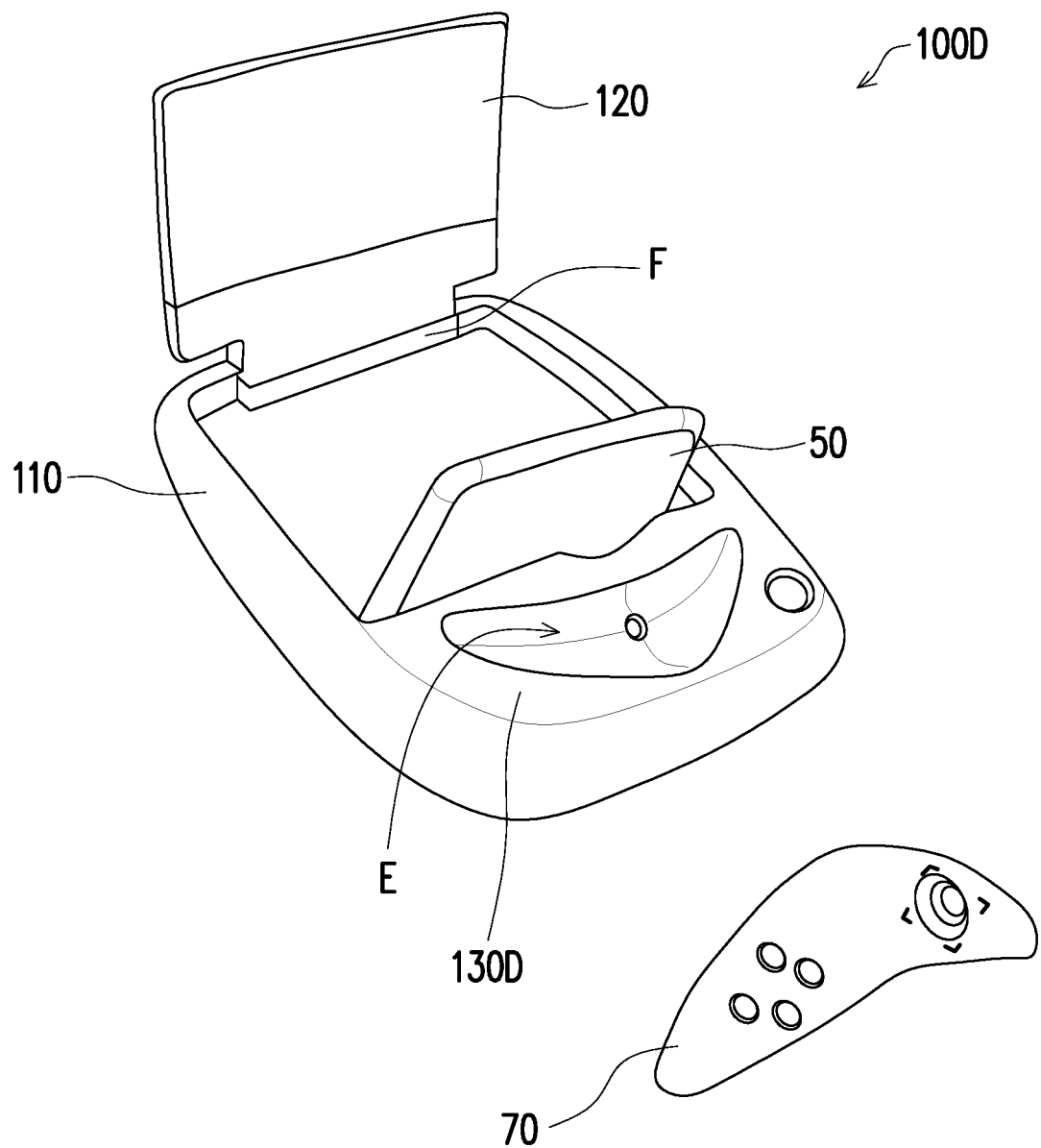

FIG. 7A and FIG. 7B are schematic views illustrating a display device assembly is being stored and unfolded according to another embodiment of the disclosure. Please refer to FIG. 7A and FIG. 7B. The display device assembly 100D provided in the present embodiment is similar to the display device assembly 100C depicted in FIG. 6A and FIG. 6B. The difference therebetween lies in that the supporting element 130D of the display device assembly 100D provided in the present embodiment can be a storage member of the accessory device 70. In particular, the supporting element 130D and the frame body 110 can be integrally formed, and a groove E capable of storing the accessory device 70 is formed on the main body. Hence, the volume of the display device assembly 100D in the storage state is smaller.

Figure 8:
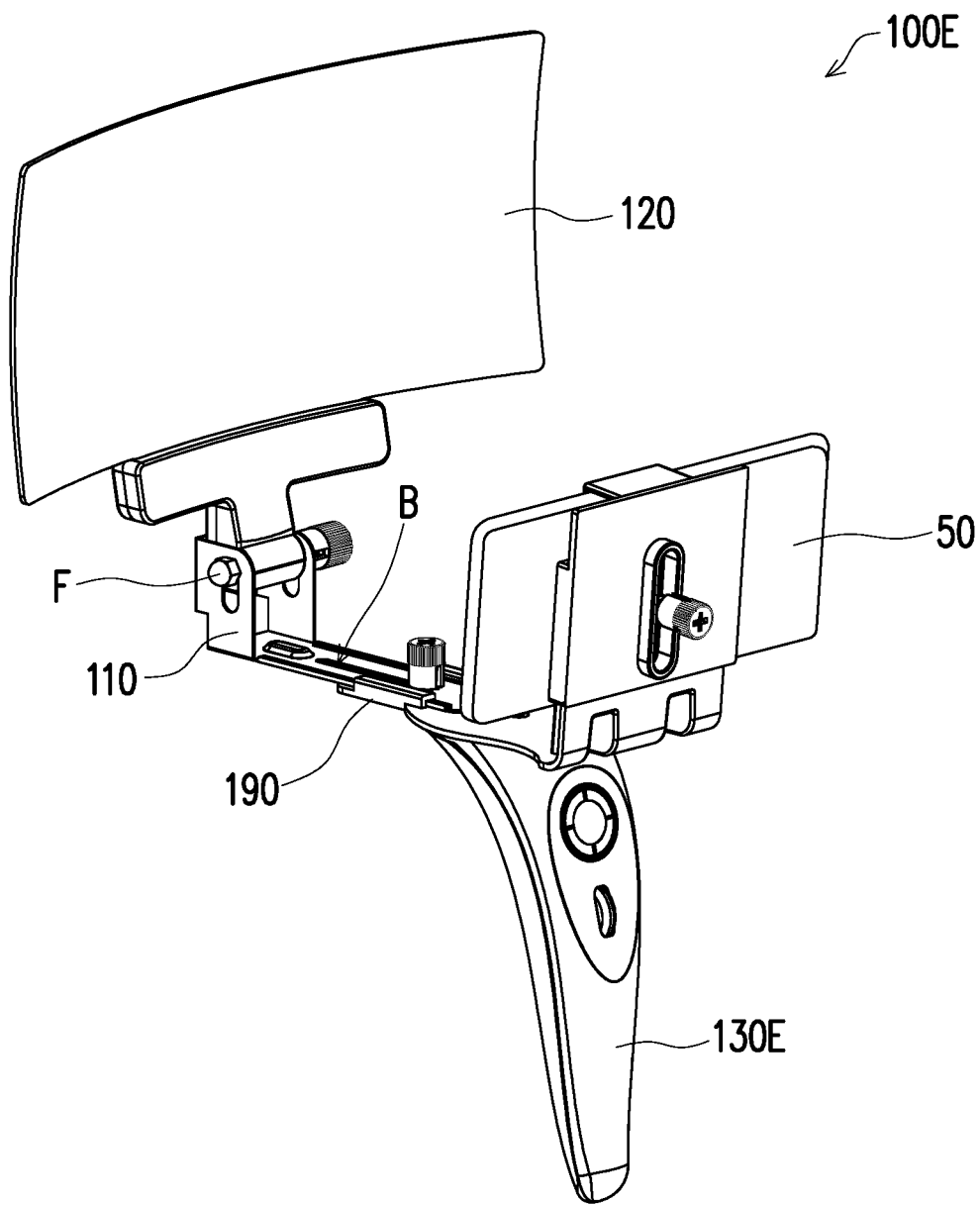
FIG. 8 is a schematic view of a display device assembly according to another embodiment of the disclosure.

FIG. 8 is a schematic view of a display device assembly according to another embodiment of the disclosure. With reference to FIG. 8, the display device assembly 100E provided in the present embodiment is similar to the display device assembly 100 depicted in FIG. 1. The difference therebetween lies in that the supporting element 130E in the present embodiment is an handheld operating device adapted to provide a control signal to the display unit 50, so as to operate the display unit 50. According to the present embodiment, the operating device is, for instance, an operating handle. The display device assembly 100E further includes a connection member 190. Specifically, in the present embodiment, the supporting element 130E is pivotally connected to the frame body 110 through the connection member 190, the frame body 110 has a sliding rail B on which the supporting element 130E slides through the connection member 190, and a portion of the frame body 110 configured to store the display unit 50 can be connected to the connection member 190 to move while the supporting element 130E slides. Hence, the distance from the display unit 50 to the optical element 120 on the frame body 110 can be adjusted by operating the supporting element 130E by hands. Besides, similar to the display device assembly 100C depicted in FIG. 6A, the display device assembly 100E provided herein has the optical element 120 which can be pivotally connected to the main body of the frame body 110 through the bearing F of the frame body 110. Hence, the included angle between the optical element 120 and the display unit 50 can be adjusted by rotating the optical element 120, so as to improve the overall optical effects.

With reference to FIG. 1, the following explanation will be provided on the premise that the display device assembly 100 depicted in FIG. 1 is taken for example, which should however not be construed as a limitation in the disclosure. Besides, in some embodiments, the display device assembly 100 can further include a processing unit (not shown) electrically connected to the display unit 50 and configured to show reversed or mirrored image on the display screen. The enlarged virtual image shown on optical element 120 will be reversed again, so the user P will obtain the enlarged virtual image in correct direction.

According to some embodiments, the display unit 50 can further display an image containing a virtual character or object. Hence, through the optical element 120, the user P is able to obtain a projection of the virtual character or object with a size or proportion similar to that of a normal human being or real object. As such, interactivity between the user P and the virtual character or object and the user experience can be improved. Moreover, in some embodiments, the brightness and the displayed color of the virtual human being can be further adjusted by software, so as to optimize the user's experience. In some embodiments, an image capturing device (not shown) may be further configured to be electrically connected to the display unit 50 for capturing an image of physical objects, and then the corresponding virtual image is projected by the display unit 50. The image capturing device then captures the environmental image and the projected virtual image. The display device assembly 100 automatically processes and adjusts the displayed image to optimize the brightness, contrast ratio, colors or other display factors of the image beams, so that the user can clearly see the virtual image and the real environment at the same time.

According to some embodiments, the display device assembly 100 can be further connected to a remote database. The database may transmit a corresponding image to the display unit 50 according to the image, sound, or other dynamic information (e.g., the gesture operation of the user P) received by the sensing element or the image capturing device in the display device assembly 100, so as to allow the user P to obtain the virtual image corresponding to the image, sound, or other dynamic information from the user P through the optical element 120. For instance, to the user can chat or interact with the projected virtual image. Hence, the display device assembly 100 is configured to provide feedback to the user's messages and the display unit 50 is configured to provide a virtual character or object with capabilities to make dialogues or interactions with the user P. The user can also use the image capturing device to capture image information of an object or image, transmit the image information to the database for analysis or comparison, and generate corresponding virtual image information to be displayed or played by the display device assembly 100. For instance, the user captures a bar code or the appearance feature of an object to generate image information. After transmitting the image information to the database, an animation message of the virtual character or object corresponding to the image information is generated or obtained by the database and is transmitted back to the display device assembly 100.

In some embodiments of the present invention, the application installed in the display unit 50 is coded to embed interaction features. The application software can utilize the camera and microphone for receiving gesture, voice, or other human messages from the user. The message processing functions, such as gesture processing function and voice processing function, of the application will recognize the gesture or voice from the user. In some embodiments of the present invention, the human messages are processed via a remote server of the artificial intelligence platforms. For example, the microphone of the display unit 50 in the display device assembly 100, 100A, 100B, 100C, 100D, or 100E receives the voice of the user, and the display unit 50 transmits the processed voice to remote server of the artificial intelligence platform for analyzing. The remote server analyzes the voice and provides feedback message or information to the display unit 50, and the earphone or speaker of the display device assembly 100, 100A, 100B, 100C, 100D, or 100E plays the feedback message, or the display unit 50 displays the feedback information and the enlarged virtual image of the feedback information is shown. In this way, the application and the display unit 50 can be the voice assistant of the user, and the display device assembly 100, 100A, 100B, 100C, 100D, or 100E provides mixed reality enhancement to the voice assistant.

The voice assistant application include natural language processing ability, such as message analyze function and keyword recognition function, so the message or request entered by the user will be processed. The voice assistant function also includes feedback generation ability, which will generate the feedback message based on the recognized keyword and analyzed result of the user's message or request. The processing of voice assistant function could be performed in remote server, wherein the application installed in the display unit 50 retrieves message or request from the user, sends them to the remote server, retrieves the feedback message generated by the server. The feedback message may include online information or services corresponding to the user's requests. In some embodiments of the present invention, the voice assistant function also include topic providing function, which generates topic selection message with conversation topics for selection by the user. The topic selection message and the conversation topics are displayed to the user, so the user can select one of the conversation topics by voice, gesture, or other types of input messages, which will be processed by the corresponding message processing function. The topic selection function will recognize the selected conversation topic based on the processed input message and the conversation topics provided to the user for selection. The feedback generation function of the voice assistant application will generate corresponding feedback message according to the selected conversation topic. The information or services provided within feedback messages will be adjusted to corresponding to the conversation topic selected by the user.

In some embodiments of the present invention, the applications installed in display unit 50 provide an avatar with the voice assistant function. The avatar will be animated corresponding to the conversations or dialogues with the user. The follow-up animation of the avatar is generated according to the feedback message from the remote server or the feedback generation function of the voice assistant application. Thus, the user can see the humanlike avatar having a conversation with the user in real time.

In some embodiments of the present invention, the applications installed in display unit 50 provide video call function, which makes the display unit 50 show real-time video of a remote person and the speaker or earphone play real-time voices of the remote person during the user's video call with the remote person. The real-time video of the remote person will be enlarged by the optical element 120 so the user can see the holographic virtual image of the remote user during the video call. The microphone of the display device assembly 100, 100A, 100B, 100C, 100D, or 100E receives and transmits the voice of the user to the remote person's terminal device. The camera of the display device assembly 100, 100A, 100B, 100C, 100D, or 100E takes real-time video of the user and transmits to the remote person's terminal device. In some embodiments of the present invention, the animated avatar or other visual representation of the remote person is displayed instead of the real-time video. The video call function can also be applied to a conference call with multiple attendees and the display unit 50 can show the real-time video of all attendees other than the user, so the user can see the holographic virtual images of the other attendees and hear their voices. The arrangement of the position of the holographic virtual images can be adjusted by the display unit 50 for optimization.

To sum up, the display device assembly provided in one or more embodiments of the disclosure can be assembled to the display unit to form a display device, and reflection of the optical element enables the user to obtain the virtual image on the optical element. The virtual image can be combined with the environmental image presented in the real world to form the AR image or the MR image. Hence, favorable optical effects can be achieved with low costs.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A display device assembly suitable for assembling a display unit to a display device adapted to a user observing in a viewing direction, the display device assembly comprising:
   a frame body adapted to fix the display unit to be inclined to the viewing direction by a first angle, the display unit being adapted to provide an image beam;
   an optical element disposed on the frame body and inclined to the viewing direction by a second angle, the optical element and the display unit facing each other, the optical element having a multi-layer coating and being located on a transmission path of the image beam; and
   a supporting element connected to the frame body, wherein the image beam is transmitted to the optical element for generating reflection and transmitted to a user, so that the user observing the optical element in the viewing direction obtains a combination of a virtual image and an environmental image presented by a real world, wherein the frame body, comprises an upper casing assembly, a lower casing assembly, and upper cover, and a leaning member, the upper casing assembly is configured to connect and fix the optical element, the lower casing assembly is configured to store and fix the display unit, the upper casing assembly is connected between the lower casing assembly and the upper cover, and the leaning member is disposed on the upper casing assembly, the lower casing assembly, or a combination thereof and adapted to lean against the user.

2. The display device assembly according to claim 1, wherein the supporting element is a headband adapted to be worn by the user on his or her head, so that the display device acts as a head-mounted display.

3. The display device assembly according to claim 1, wherein the lower casing assembly comprises a main body and a supporting bracket, and the supporting bracket is disposed on the main body and connected and fixed to the optical element.

4. The display device assembly according to claim 1, wherein the lower casing assembly comprises a main body, an elastic element, and a clamping assembly, the elastic element is disposed in a groove of the main body, and the clamping assembly is connected to the elastic element and clamps the display unit.

5. The display device assembly according to claim 4, wherein the elastic element is a spring with a collar structure at two ends, one of the two ends is fixed to the main body by a fixing element, and the other end is connected to the clamping assembly.

6. The display device assembly according to claim 4, wherein the clamping assembly comprises a first clamping portion, a second clamping portion, and two protection cushions, wherein each of the first clamping portion and the second clamping portion has a hook structure adapted to clamp the display unit, and the two protection cushions are respectively disposed on inner sides of the hook structures of the first clamping portion and the second clamping portion.

7. The display device assembly according to claim 1, further comprising:
   a multimedia element electrically connected to the display unit, wherein the multimedia element is an earphone or a speaker.

8. The display device assembly according to claim 1, further comprising:
   a sensing element electrically connected to the display unit and adapted to obtain a scenario from an environment or the user, so as to adjust light emitting effects of the display unit.

9. The display device assembly according to claim 1, further comprising:
   a modulation device electrically connected to the optical element and adapted to modulate reflectivity of the optical element, wherein the optical element is a liquid crystal display layer or another electrical control material.

10. The display device assembly according to claim 1, wherein an included angle between the optical element and the display unit is in a range from 30 degrees to 80 degrees.

11. The display device assembly according to claim 1, wherein a distance from the optical element to the display unit is in a range from 50 mm to 150 mm.

12. The display device assembly according to claim 1, wherein when a height of an image displayed by the display unit is 80 mm, an enlarged virtual image with a height from 120 mm to 800 mm is displayed behind the optical element.

13. The display device assembly according to claim 1, wherein an included angle between a tangent of a center point of the optical element and a plane parallel to the optical element is in a range from 15 degrees to 60 degrees.

14. The display device assembly according to claim 1, wherein the supporting element is a helmet adapted to be worn by the user on his or her head.

15. The display device assembly according to claim 1, wherein the frame body comprises a bearing, and the optical element is adapted to rotate relative to the frame body through the bearing, so as to be combined with or separated from the frame body.

16. The display device assembly according to claim 1, wherein the supporting element is a connection structure adapted to be connected to an accessory device, and the accessory device is adapted to provide a control signal to the display unit.

17. The display device assembly according to claim 1, wherein the supporting element is a storage member adapted to store an accessory device, and the accessory device is adapted to provide a control signal to the display unit.

18. The display device assembly according to claim 1, further comprising:
- a connection member pivotally connected between the supporting element and a sliding rail of the frame body, the supporting element is adapted to slide on the sliding rail through the connection member, and the supporting element is an operating device electrically connected to the display unit and adapted to provide a control signal to the display unit.

19. A display device assembly suitable for assembling a display unit to a display adapted to a user observing in a viewing direction, the display device assembly comprising:

- a frame body adapted to fix the display unit to be inclined to the viewing direction by a first angle, the display unit being adapted to provide an image beam;
- an optical element disposed on the frame body and inclined to the viewing direction by a second angle, the optical element and the display unit facing each other, the optical element having a multi-layer coating and being located on a transmission path of the image beam; and
- a supporting element connected to the frame body, wherein the image beam is transmitted to the optical element for generating reflection and transmitted to a user, so that the user observing the optical element in the viewing direction obtains a combination of a virtual image and an environmental image presented by a real world,
- wherein the supporting element is a stand and has a sound channel allowing a sound made by the display unit to be transmitted to the optical element through the sound channel and transmitted toward a direction close to the display unit after the sound is reflected by the optical element.

* * * * *